Aug. 18, 1964  J. H. SMITH  3,144,793

TUBELESS TIRE PUNCTURE REPAIR TOOL

Filed March 27, 1961

Joseph H. Smith
INVENTOR.

BY Eugene D. Farley

Atty.

United States Patent Office 3,144,793
Patented Aug. 18, 1964

3,144,793
TUBELESS TIRE PUNCTURE REPAIR TOOL
Joseph H. Smith, 3151 Pine St. SW., Tacoma, Wash.
Filed Mar. 27, 1961, Ser. No. 98,403
2 Claims. (Cl. 81—15.6)

This invention relates to a tool for repairing punctures in tubeless tires.

Since the sealant normally contained in tubeless tires is not effective in sealing punctures, it is necessary when the puncture is large to deflate the tire, demount it, and subject it to the usual vulcanization procedure.

It is the general object of the present invention to provide a tool by means of which punctures in tubeless tires may be sealed effectively, without either deflating or removing the tire.

It is another important object of the present invention to provide a tubeless tire puncture repair tool which may be used to seal punctures effectively by distributing a sealant uniformly along the length of the puncture, without dissipating the sealant in the interior of the tire.

Still a further object of the present invention is to provide a practical, efficient inexpensive tubeless tire repair tool which is simple in its operation and which can be operated effectively by the average motorist.

The manner in which the foregoing and other objects of this invention are accomplished will be apparent from the accompanying specification and claims, considered together with the accompanying drawings, in which:

Figure 3:
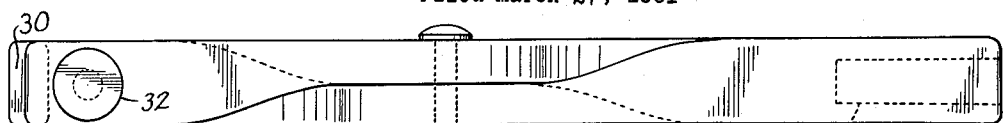
FIGS. 2 and 3 are side and plan views, respectively, of a pressure applying tool for operating the collapsible receptacle of FIG. 1.
Figure 2:
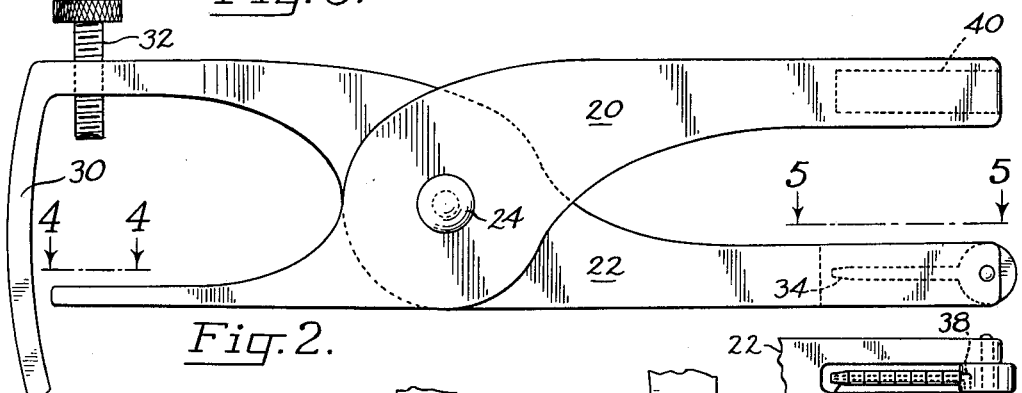
Figure 4:
FIG. 4 is a fragmentary plan view, looking in the direction of the arrows on line 4—4 of FIG. 2, and illustrating seating means on the tool of FIGS. 2 and 3 for seating the collapsible receptacle of FIG. 1.
Figures 1, 6, 7:
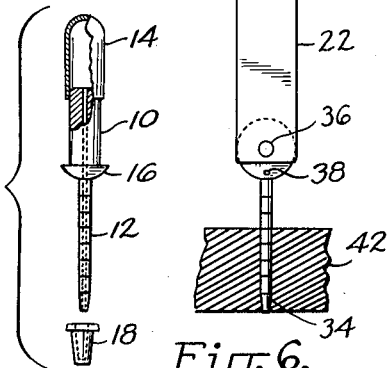
FIG. 1 is a view in elevation, partly in section, of a collapsible receptacle equipped with a needle for pumping sealant into the puncture.
FIG. 6 is a fragmentary view in elevation illustrating the manner of use of the gauge of FIG. 5.
Figure 8:
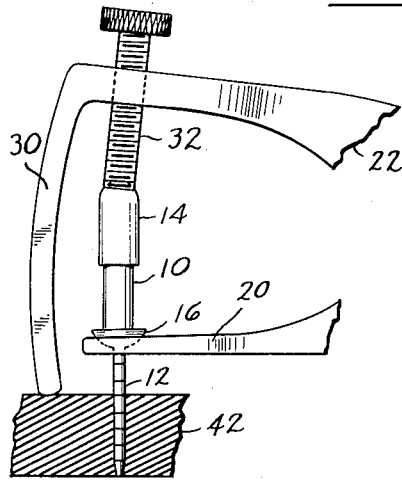
Figure 9:
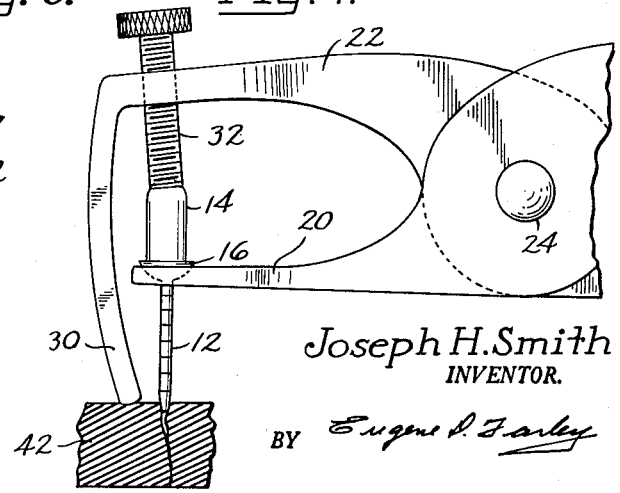

FIG. 7 is a fragmentary view in elevation illustrating the manner of inserting the collapsible receptacle of FIG. 1 in the tire, using the tool of FIGS. 2 and 3; and FIGS. 8 and 9 are fragmentary side views illustrating in stepwise manner the manner of applying sealant to the puncture using the collapsible receptacle of FIG. 1, operated by the tool of FIGS. 2 and 3.

In its broadest aspect the tubeless tire puncture repair tool of my invention comprises in combination a syringe including a collapsible receptacle adapted to contain a fluid tire sealant and a hollow needle communicating with the receptacle, sized for insertion through the puncture into the interior of the tire. Pressure-applying means are provided for withdrawing the needle while contemporaneously applying collapsing pressure to the receptacle, thereby ejecting sealant through the needle as it is withdrawn from the puncture. Means also are provided for measuring the depth of the puncture and adjusting the tool correspondingly, so that sealant will be applied selectively to the puncture, rather than forced ineffectively into the interior of the tire. Still further, means are supplied for inserting the needle easily and readily into the puncture preliminary to introducing the sealant.

Considering the foregoing in greater detail and with particular reference to the drawings:

One of the elements of the tool of my invention is the syringe illustrated in FIG. 1. It comprises a hollow receptacle having a body 10 with a channel longitudinally therethrough communicating with a hollow, graduated needle or spur 12. A cap or sleeve 14 having its outer end closed and its inner end telescoped over body 10 contains a quantity of suitable puncture sealing material.

Body 10 is formed with an annular flange 16, both surfaces of which are bearing surfaces, the upper surface being flat and the lower surface arcuate in contour. A cap 18 is dimensioned to fit over the end of hollow needle 12.

The plier-like tool, by means of which the syringe of FIG. 1 is applied, is illustrated in FIGS. 2 and 3.

It comprises a pair of lever arms 20, 22 pivotally interconnected at a central point by means of rivet 24.

The jaw forming portion of lever arm 20 is provided at its outer extremity with a bifurcation 26, the inner end of which is recessed. The bifurcation is sized to receive needle 12. The recessed portion of the bifurcation is dimensioned to receive the arcuate bearing surface of flange 16.

The jaw forming end of lever arm 22 is formed with an angled extension 30 which extends in the direction of the opposed jaw forming member, beyond the plane thereof when the tool is in operative position. Its contour may be slightly arcuate to afford clearance. Its end provides a bearing surface for positioning the tool against the tire.

Means are present for adjustably positioning the collapsible receptacle between lever arms 20, 22. In the illustrated form of the invention such means comprise a screw 32 threaded through the jaw-forming portion of lever arm 22. The end of this screw may be cupped slightly to receive the end of cap 14 on the collapsible receptacle.

Figure 5:
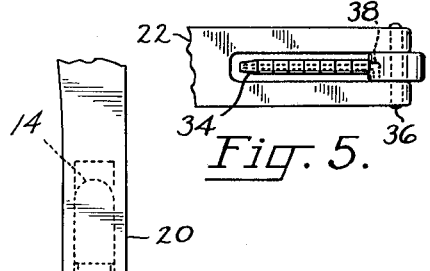
FIG. 5 is a fragmentary plan view, looking in the direction of the arrows of line 5—5 of FIG. 2, and illustrating a gauge used for determining the depth of the puncture in the operation of the tool of FIGS. 2 and 3.

Means also are present for measuring the depth of the puncture so that needle 12 may be inserted to the proper depth. As shown in FIGS. 2, 5 and 6, the means provided comprise a graduated, hollow needle or spur 34 pivoted within a recess in the handle of lever 22 by means of pin 36. The needle is graduated to the same scale as needle 12 and its dimensions are such that it can be inserted easily in a puncture of the usual size. A laterally extending vent 38 communicates with the upper end of the passageway through the needle.

Means further are present for inserting needle 12 in the puncture. For this purpose the handle of lever 20 is provided with a recess 40, the diameter and depth of which are sufficient to house body 10 and cap piece 14 of the collapsible receptacle. The outer end surface of the handle adjacent the recess is flat and is adapted to bear against the upper bearing surface of flange 16 on the syringe.

Operation

The manner of use of the herein described tool is as follows:

Without deflating or removing the tire, the nail first is removed, noting the angle of penetration. Measuring needle 34 then is pivoted into operative position and slowly inserted into the puncture as shown in FIG. 6. The penetration is continued until the end of the needle has just reached the inside of the tire as indicated by the escape of air through vent 38. The depth of penetration is noted on the needle graduations.

After removal of the measuring needle, the collapsible receptacle of FIG. 1 is inserted in recess 40 of lever arm 20 with the end of the arm bearing against the inner flat surface of flange 16. Cap 18 is removed and needle 12 inserted in the puncture to the depth indicated by the graduations of measuring needle 34. This will bring the end of needle 12 just to the inner surface of the tire.

Next, the tool is placed in the position of FIG. 8. This involves opening the jaws, placing needle 12 in the bifurcation of the working extremity of lever arm 20, and seating the arcuate outer surface of flange 16 in the recessed inner portion of the bifurcation. Screw 32 then is adjusted until its cupped inner end nests over the end of cap 14 and the bearing surface of extension 30 rests on the outside of the tire.

The handles of the tool then are squeezed slowly together whereupon the jaw member of lever 20 exerts withdrawing pressure on needle 12 while the jaw member of lever 22, acting through screw 32 telescopes cap 14 over body 10, thereby exerting collapsing pressure on the receptacle and pumping the sealant out through needle 12.

As a consequence, the sealant is distributed uniformly through the puncture without being dissipated inside the tire, and without the necessity of deflating the tire or removing it from the rim.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:

1. A tool for use in repairing punctures in tubeless tires and comprising a pair of lever arms pivoted to each other intermediate their ends in plier-like fashion and forming a pair of opposed jaws, one of the jaws having an extension extending at substantially right angles in the direction of the other of the jaws and reaching beyond the plane of the same when the tool is in operative position, the other of the jaws having a bifurcated outer end for reception therethrough of a hollow needle associated with a collapsible fluid tire sealant receptacle with the latter resting upon said bifurcated jaw, and screw means extending through said one of the jaws in the direction of the other of the jaws and adapted to bear adjustably on the end of the collapsible receptacle opposite the bifurcated jaw.

2. A tool for use in repairing punctures in tubeless tires, comprising a pair of opposed jaws one movable toward and away from the other, one of the jaws having adjacent its outer end an opening adapted to receive therethrough a syringe needle associated with a collapsible fluid tire sealant receptacle, with the latter supported on said jaw and extending toward the other jaw, screw threaded through said other jaw and extending adjustably toward the opening in said one jaw and adapted to bear against the end of the collapsible receptacle opposite the opening in said one jaw, and an extension on said other jaw projecting substantially perpendicular to and beyond the plane of said one jaw when the tool is in operative position for bearing against a tire, whereby movement of the jaws toward each other effects simultaneous collapsing of the syringe receptacle to express sealant from the needle and withdrawal of the needle from the puncture opening in the tire.

References Cited in the file of this patent

UNITED STATES PATENTS

| | | |
|---|---|---|
| 495,454 | Cummings et al. | Apr. 11, 1893 |
| 807,240 | Carstensen | Dec. 12, 1905 |
| 1,490,019 | Neumaier | Apr. 8, 1924 |
| 1,555,282 | Hein | Sept. 29, 1925 |
| 1,926,367 | Booth | Sept. 12, 1933 |
| 2,342,479 | Miles et al. | Feb. 22, 1944 |
| 2,578,814 | Kollsman | Dec. 18, 1951 |
| 2,759,635 | Boyer | Aug. 21, 1956 |
| 2,828,657 | Fromberg | Apr. 1, 1958 |
| 2,956,460 | Nowotny | Oct. 18, 1960 |
| 2,966,190 | Nowotny | Dec. 27, 1960 |

FOREIGN PATENTS

| | | |
|---|---|---|
| 725,829 | France | May 18, 1932 |